(12) United States Patent
Benson et al.

(10) Patent No.: US 11,507,201 B2
(45) Date of Patent: Nov. 22, 2022

(54) VIRTUAL REALITY

(71) Applicant: Sony Interactive Entertainment Inc., Tokyo (JP)

(72) Inventors: Simon Mark Benson, Northwich (GB); Simon John Hall, London (GB); Nicholas Ward-Foxton, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/467,218

(22) PCT Filed: Dec. 6, 2017

(86) PCT No.: PCT/GB2017/053676
§ 371 (c)(1),
(2) Date: Jun. 6, 2019

(87) PCT Pub. No.: WO2018/104732
PCT Pub. Date: Jun. 14, 2018

(65) Prior Publication Data
US 2020/0089333 A1    Mar. 19, 2020

(30) Foreign Application Priority Data
Dec. 9, 2016    (GB) ........................... 1620985

(51) Int. Cl.
*G06F 3/03*    (2006.01)
*A63F 13/212*    (2014.01)
(Continued)

(52) U.S. Cl.
CPC .......... *G06F 3/0325* (2013.01); *A63F 13/212* (2014.09); *A63F 13/213* (2014.09);
(Continued)

(58) Field of Classification Search
CPC ............ A63F 2300/8082; A63F 13/212; A63F 13/213; G02B 27/017; G06F 3/0325; G06F 3/012
See application file for complete search history.

(56) References Cited

U.S. PATENT DOCUMENTS 8,140,197 B2 *  3/2012  Lapidot ................... G06F 1/163
                                                    701/9
9,498,720 B2 * 11/2016  Geisner .................. A63F 13/65
(Continued)

FOREIGN PATENT DOCUMENTS

EP    1731943 A1    12/2006
EP    3552052 A1    10/2019
(Continued)

OTHER PUBLICATIONS

Combined Examination and Search Report for corresponding GB Application No. 1620985.0, 8 pages, dated May 31, 2017.
(Continued)

*Primary Examiner* — Chase E Leichliter
(74) *Attorney, Agent, or Firm* — Matthew B. Dernier, Esq.

(57) ABSTRACT

A virtual reality apparatus includes a head mountable display (HMD); a detector to detect a deviation of a current orientation of the HMD from a base orientation of the HMD; and a generator to generate content for presentation to the wearer of the HMD to prompt the wearer of the HMD to turn his head so as to change the orientation of the HMD towards the base orientation.

13 Claims, 11 Drawing Sheets

(51) Int. Cl.
    *A63F 13/213*     (2014.01)
    *G06F 3/01*     (2006.01)

(52) U.S. Cl.
    CPC .............. *G06F 3/012* (2013.01); *G06F 3/016* (2013.01); *A63F 2250/497* (2013.01); *A63F 2300/8082* (2013.01)

(56) References Cited

U.S. PATENT DOCUMENTS

| | | | | |
|---|---|---|---|---|
| 9,648,438 | B1* | 5/2017 | Petrov | G02B 27/017 |
| 9,766,458 | B2* | 9/2017 | Ikeda | G02B 27/017 |
| 9,928,650 | B2* | 3/2018 | Inomata | G06F 3/04815 |
| 10,113,877 | B1* | 10/2018 | Schaefer | G01C 21/3629 |
| 10,642,349 | B2* | 5/2020 | Kake | G06F 3/011 |
| 11,045,733 | B2* | 6/2021 | Bickerstaff | G06F 1/163 |
| 2002/0072416 | A1* | 6/2002 | Ohshima | G06F 3/011 |
| | | | | 463/43 |
| 2009/0112469 | A1* | 4/2009 | Lapidot | G01C 23/00 |
| | | | | 701/469 |
| 2010/0157433 | A1* | 6/2010 | Mukawa | G02B 27/0172 |
| | | | | 359/633 |
| 2013/0120224 | A1* | 5/2013 | Cajigas | G09G 5/00 |
| | | | | 345/8 |
| 2013/0328928 | A1* | 12/2013 | Yamagishi | A63F 13/25 |
| | | | | 345/633 |
| 2014/0267420 | A1* | 9/2014 | Schowengerdt | G06T 19/006 |
| | | | | 345/633 |
| 2015/0007114 | A1* | 1/2015 | Poulos | G06F 3/012 |
| | | | | 715/852 |
| 2015/0049002 | A1* | 2/2015 | Ishikawa | G02B 27/0172 |
| | | | | 345/8 |
| 2015/0085171 | A1* | 3/2015 | Kim | H04N 5/232945 |
| | | | | 348/333.04 |
| 2015/0094142 | A1* | 4/2015 | Stafford | G06F 3/017 |
| | | | | 463/31 |
| 2015/0310665 | A1* | 10/2015 | Michail | G06V 40/19 |
| | | | | 345/419 |
| 2016/0131912 | A1* | 5/2016 | Border | G02B 5/3083 |
| | | | | 345/8 |
| 2016/0187651 | A1* | 6/2016 | Border | B60Q 9/008 |
| | | | | 345/8 |
| 2017/0053545 | A1* | 2/2017 | Yang | G06F 3/012 |
| 2017/0076497 | A1* | 3/2017 | Inomata | G06F 3/0346 |
| 2017/0092235 | A1* | 3/2017 | Osman | G06F 3/013 |
| 2017/0221264 | A1* | 8/2017 | Perry | G06F 3/011 |
| 2018/0101226 | A1* | 4/2018 | Kake | G06F 1/163 |
| 2018/0143693 | A1* | 5/2018 | Calabrese | G06F 3/0304 |
| 2018/0356884 | A1* | 12/2018 | Lee | H04S 3/008 |
| 2020/0038752 | A1* | 2/2020 | Bickerstaff | G02B 27/0093 |
| 2020/0089333 | A1 | 3/2020 | Benson | |
| 2020/0103658 | A1* | 4/2020 | Ishikawa | G09G 5/006 |

FOREIGN PATENT DOCUMENTS

| | | |
|---|---|---|
| JP | 5981006 B1 | 8/2016 |
| JP | 2016192027 A | 11/2016 |
| KR | 20160027627 A | 3/2016 |
| WO | 2006087709 A1 | 8/2006 |
| WO | 2015048038 A2 | 4/2015 |
| WO | 2016185634 A1 | 11/2016 |
| WO | 2017001724 A1 | 1/2017 |
| WO | 2018104732 A1 | 6/2018 |

OTHER PUBLICATIONS

International Search Report and Written Opinion for corresponding PCT Application No. PCT/GB2017/053676, 13 pages, dated Mar. 29, 2018.
Examination Report for corresponding GB Application No. 1620985.0, 6 pages, dated May 18, 2021.
Notification of Reasons for Refusal for corresponding JP Application No. 2019-529870, 5 pages, dated Nov. 16, 2021.

* cited by examiner

LEFT  RIGHT

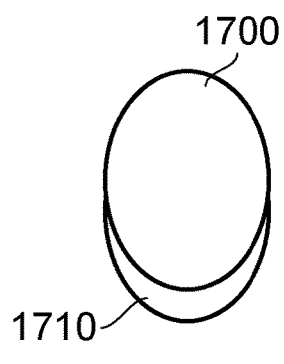
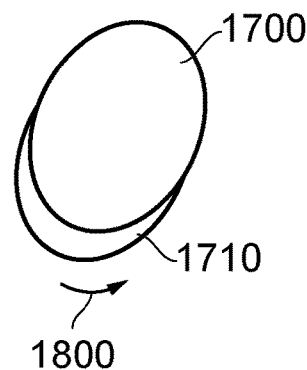
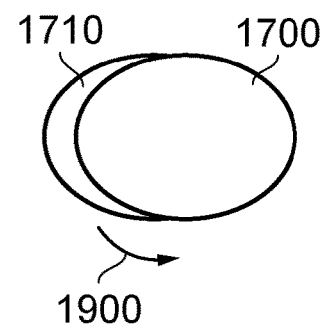
FIG. 17a      FIG. 18a      FIG. 19a
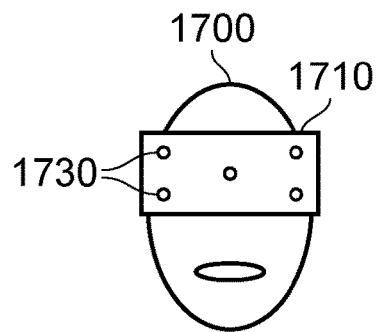
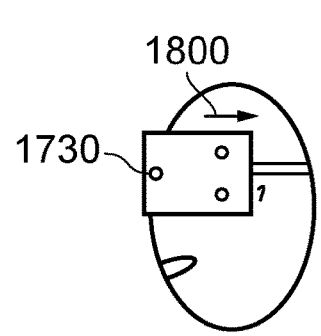
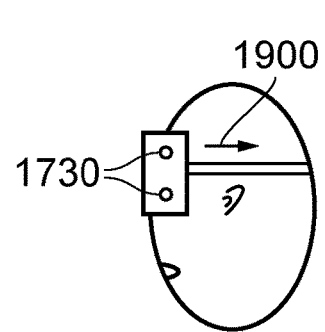
FIG. 17b      FIG. 18b      FIG. 19b

VIRTUAL REALITY

BACKGROUND

Field of the Disclosure

This disclosure relates to virtual reality systems and methods.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

A head-mountable display (HMD) is one example of a head-mountable apparatus for use in a virtual reality system in which an HMD wearer views a virtual environment. In an HMD, an image or video display device is provided which may be worn on the head or as part of a helmet. Either one eye or both eyes are provided with small electronic display devices.

Some HMDs allow a displayed image to be superimposed on a real-world view. This type of HMD can be referred to as an optical see-through HMD and generally requires the display devices to be positioned somewhere other than directly in front of the user's eyes. Some way of deflecting the displayed image so that the user may see it is then required. This might be through the use of a partially reflective mirror placed in front of the user's eyes so as to allow the user to see through the mirror but also to see a reflection of the output of the display devices. In another arrangement, disclosed in EP-A-1 731 943 and US-A-2010/0157433, a waveguide arrangement employing total internal reflection is used to convey a displayed image from a display device disposed to the side of the user's head so that the user may see the displayed image but still see a view of the real world through the waveguide. Once again, in either of these types of arrangement, a virtual image of the display is created (using known techniques) so that the user sees the virtual image at an appropriate size and distance to allow relaxed viewing. For example, even though the physical display device may be tiny (for example, 10 mm×10 mm) and may be just a few millimetres from the user's eye, the virtual image may be arranged so as to be perceived by the user at a distance of (for example) 20 m from the user, having a perceived size of 5 m×5 m.

Other HMDs, however, allow the user only to see the displayed images, which is to say that they obscure the real world environment surrounding the user. This type of HMD can position the actual display devices in front of the user's eyes, in association with appropriate lenses or other optical components which place a virtual displayed image at a suitable distance for the user to focus in a relaxed manner—for example, at a similar virtual distance and perceived size as the optical see-through HMD described above. This type of device might be used for viewing movies or similar recorded content, or for viewing so-called virtual reality content representing a virtual space surrounding the user. It is of course however possible to display a real-world view on this type of HMD, for example by using a forward-facing camera to generate images for display on the display devices.

Although the original development of HMDs and virtual reality was perhaps driven by the military and professional applications of these devices, HMDs are becoming more popular for use by casual users in, for example, computer game or domestic computing applications.

The foregoing paragraphs have been provided by way of general introduction, and are not intended to limit the scope of the following claims. The described embodiments, together with further advantages, will be best understood by reference to the following detailed description taken in conjunction with the accompanying drawings.

Various aspects and features of the present disclosure are defined in the appended claims and within the text of the accompanying description and include at least a head mountable apparatus such as a display and a method of operating a head-mountable apparatus as well as a computer program.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 17a, 18a and 19a schematically represent orientations, relative to a camera, of a user wearing an HMD;

FIGS. 17b, 18b and 19b schematically represent captured images of the arrangements of FIGS. 17a, 18a and 19a respectively;

DESCRIPTION OF THE EMBODIMENTS

Figure 1:
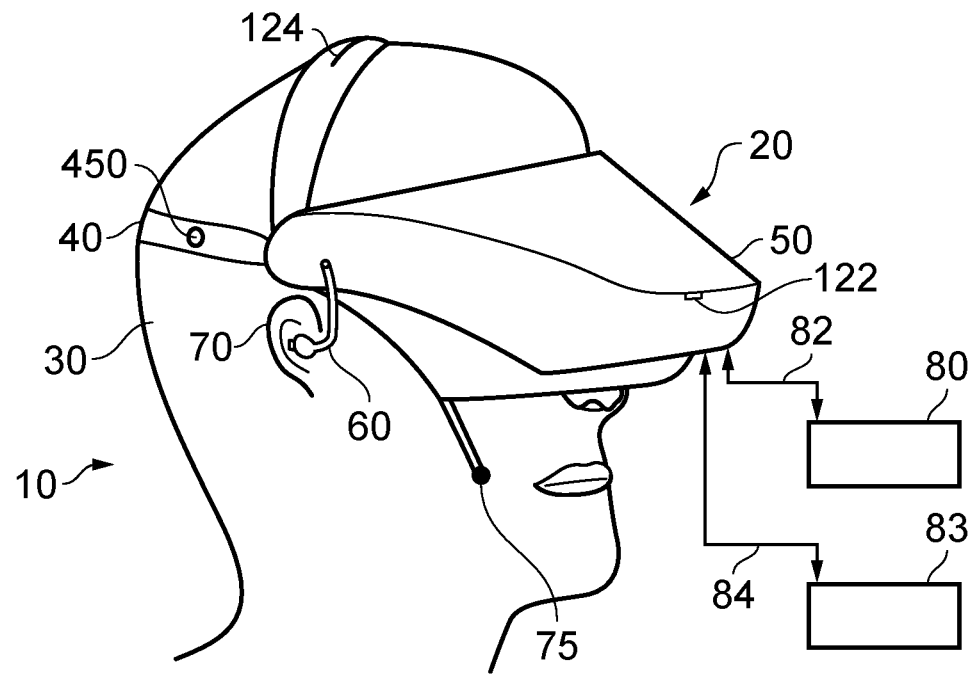
FIG. 1 schematically illustrates an HMD worn by a user.

Referring now to FIG. 1, a user 10 is wearing an HMD 20 (as an example of a generic head-mountable apparatus or virtual reality apparatus). The HMD comprises a frame 40, in this example formed of a rear strap and a top strap, and a display portion 50.

Note that the HMD of FIG. 1 may comprise further features, to be described below in connection with other drawings, but which are not shown in FIG. 1 for clarity of this initial explanation.

The HMD of FIG. 1 completely (or at least substantially completely) obscures the user's view of the surrounding environment. All that the user can see is the pair of images displayed within the HMD.

The HMD has associated headphone audio transducers or earpieces 60 which fit into the user's left and right ears 70. The earpieces 60 replay an audio signal provided from an external source, which may be the same as the video signal source which provides the video signal for display to the user's eyes. A boom microphone 75 is mounted on the HMD so as to extend towards the user's mouth.

The combination of the fact that the user can see only what is displayed by the HMD and, subject to the limitations of the noise blocking or active cancellation properties of the earpieces and associated electronics, can hear only what is provided via the earpieces, mean that this HMD may be considered as a so-called "full immersion" HMD. Note however that in some embodiments the HMD is not a full immersion HMD, and may provide at least some facility for the user to see and/or hear the user's surroundings. This could be by providing some degree of transparency or partial transparency in the display arrangements, and/or by projecting a view of the outside (captured using a camera, for example a camera mounted on the HMD) via the HMD's displays, and/or by allowing the transmission of ambient sound past the earpieces and/or by providing a microphone to generate an input sound signal (for transmission to the earpieces) dependent upon the ambient sound.

A front-facing camera 122 may capture images to the front of the HMD, in use. A Bluetooth® antenna 124 may provide communication facilities or may simply be arranged as a directional antenna to allow a detection of the direction of a nearby Bluetooth transmitter.

In operation, a video signal is provided for display by the HMD. This could be provided by an external video signal source 80 such as a video games machine or data processing apparatus (such as a personal computer), in which case the signals could be transmitted to the HMD by a wired or a wireless connection 82. Examples of suitable wireless connections include Bluetooth® connections. Audio signals for the earpieces 60 can be carried by the same connection. Similarly, any control signals passed from the HMD to the video (audio) signal source may be carried by the same connection. Furthermore, a power supply 83 (including one or more batteries and/or being connectable to a mains power outlet) may be linked by a cable 84 to the HMD. Note that the power supply 83 and the video signal source 80 may be separate units or may be embodied as the same physical unit. There may be separate cables for power and video (and indeed for audio) signal supply, or these may be combined for carriage on a single cable (for example, using separate conductors, as in a USB cable, or in a similar way to a "power over Ethernet" arrangement in which data is carried as a balanced signal and power as direct current, over the same collection of physical wires). The video and/or audio signal may be carried by, for example, an optical fibre cable. In other embodiments, at least part of the functionality associated with generating image and/or audio signals for presentation to the user may be carried out by circuitry and/or processing forming part of the HMD itself. A power supply may be provided as part of the HMD itself.

Some embodiments of the disclosure are applicable to an HMD having at least one electrical and/or optical cable linking the HMD to another device, such as a power supply and/or a video (and/or audio) signal source. So, embodiments of the disclosure can include, for example:

(a) an HMD having its own power supply (as part of the HMD arrangement) but a cabled connection to a video and/or audio signal source;

(b) an HMD having a cabled connection to a power supply and to a video and/or audio signal source, embodied as a single physical cable or more than one physical cable;

(c) an HMD having its own video and/or audio signal source (as part of the HMD arrangement) and a cabled connection to a power supply; or (d) an HMD having a wireless connection to a video and/or audio signal source and a cabled connection to a power supply.

If one or more cables are used, the physical position at which the cable 82 and/or 84 enters or joins the HMD is not particularly important from a technical point of view. Aesthetically, and to avoid the cable(s) brushing the user's face in operation, it would normally be the case that the cable(s) would enter or join the HMD at the side or back of the HMD (relative to the orientation of the user's head when worn in normal operation). Accordingly, the position of the cables 82, 84 relative to the HMD in FIG. 1 should be treated merely as a schematic representation.

Accordingly, the arrangement of FIG. 1 provides an example of a head-mountable display system comprising a frame to be mounted onto an observer's head, the frame defining one or two eye display positions which, in use, are positioned in front of a respective eye of the observer and a display element mounted with respect to each of the eye display positions, the display element providing a virtual image of a video display of a video signal from a video signal source to that eye of the observer.

FIG. 1 shows just one example of an HMD. Other formats are possible: for example an HMD could use a frame more similar to that associated with conventional eyeglasses, namely a substantially horizontal leg extending back from the display portion to the top rear of the user's ear, possibly curling down behind the ear. In other (not full immersion) examples, the user's view of the external environment may not in fact be entirely obscured; the displayed images could be arranged so as to be superposed (from the user's point of view) over the external environment. An example of such an arrangement will be described below with reference to FIG. 4.

In the example of FIG. 1, a separate respective display is provided for each of the user's eyes. A schematic plan view of how this is achieved is provided as FIG. 2, which illustrates the positions 100 of the user's eyes and the relative position 110 of the user's nose. The display portion 50, in schematic form, comprises an exterior shield 120 to mask ambient light from the user's eyes and an internal shield 130 which prevents one eye from seeing the display intended for the other eye. The combination of the user's face, the exterior shield 120 and the interior shield 130 form two compartments 140, one for each eye. In each of the compartments there is provided a display element 150 and one or more optical elements 160. The way in which the display element and the optical element(s) cooperate to provide a display to the user will be described with reference to FIG. 3.

Figure 3:
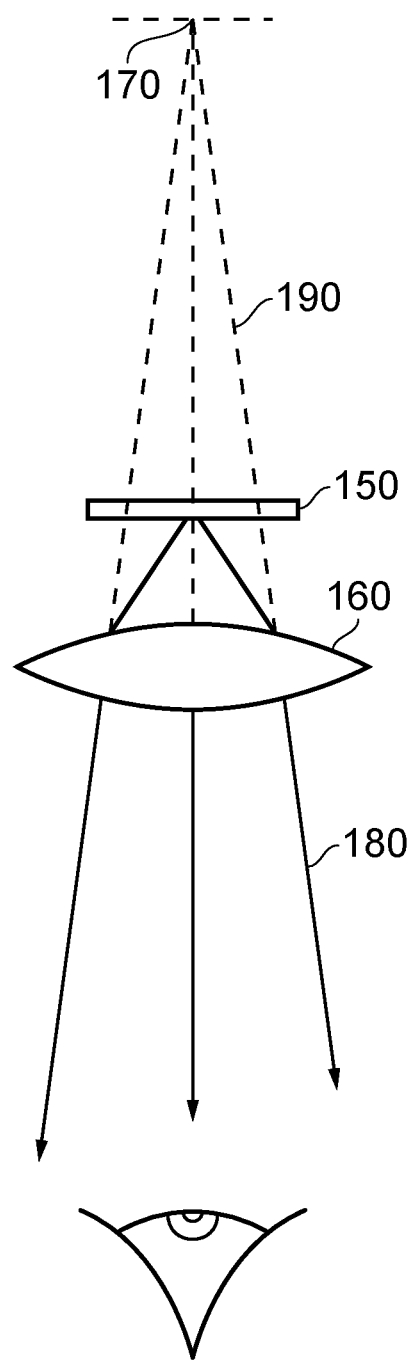
FIG. 3 schematically illustrates the formation of a virtual image by an HMD.

Referring to FIG. 3, the display element 150 generates a displayed image which is (in this example) refracted by the optical elements 160 (shown schematically as a convex lens but which could include compound lenses or other elements) so as to generate a virtual image 170 which appears to the user to be larger than and significantly further away than the real image generated by the display element 150. As an example, the virtual image may have an apparent image size (image diagonal) of more than 1 m and may be disposed at a distance of more than 1 m from the user's eye (or from the frame of the HMD). In general terms, depending on the purpose of the HMD, it is desirable to have the virtual image disposed a significant distance from the user. For example, if the HMD is for viewing movies or the like, it is desirable that the user's eyes are relaxed during such viewing, which requires a distance (to the virtual image) of at least several metres. In FIG. 3, solid lines (such as the line 180) are used to denote real optical rays, whereas broken lines (such as the line 190) are used to denote virtual rays.

Figure 4:
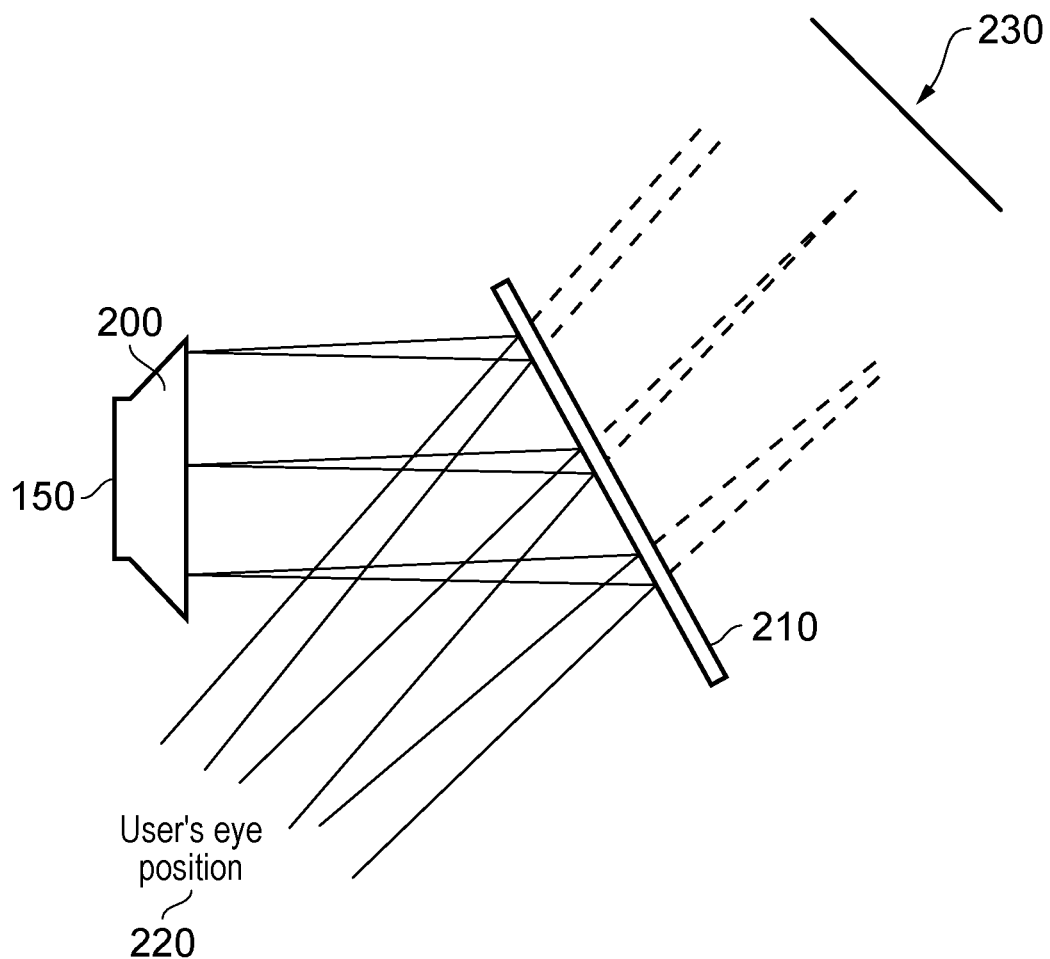
FIG. 4 schematically illustrates another type of display for use in an HMD.

An alternative arrangement is shown in FIG. 4. This arrangement may be used where it is desired that the user's view of the external environment is not entirely obscured. However, it is also applicable to HMDs in which the user's external view is wholly obscured. In the arrangement of FIG. 4, the display element 150 and optical elements 200 cooperate to provide an image which is projected onto a mirror 210, which deflects the image towards the user's eye position 220. The user perceives a virtual image to be located at a position 230 which is in front of the user and at a suitable distance from the user.

In the case of an HMD in which the user's view of the external surroundings is entirely obscured, the mirror 210 can be a substantially 100% reflective mirror. The arrangement of FIG. 4 then has the advantage that the display element and optical elements can be located closer to the centre of gravity of the user's head and to the side of the user's eyes, which can produce a less bulky HMD for the user to wear. Alternatively, if the HMD is designed not to completely obscure the user's view of the external environment, the mirror 210 can be made partially reflective so that the user sees the external environment, through the mirror 210, with the virtual image superposed over the real external environment.

Figure 5:
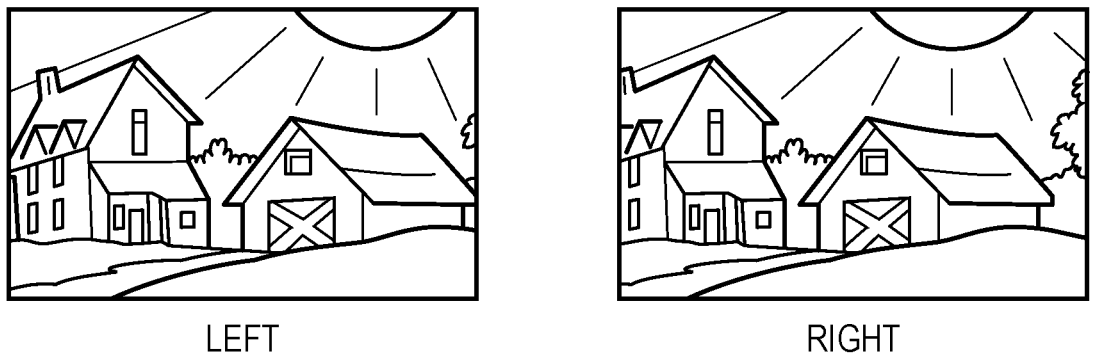
FIG. 5 schematically illustrates a pair of stereoscopic images.

In the case where separate respective displays are provided for each of the user's eyes, it is possible to display stereoscopic images. An example of a pair of stereoscopic images for display to the left and right eyes is shown in FIG. 5. The images exhibit a lateral displacement relative to one another, with the displacement of image features depending upon the (real or simulated) lateral separation of the cameras by which the images were captured, the angular convergence of the cameras and the (real or simulated) distance of each image feature from the camera position.

Note that the lateral displacements in FIG. 5 could in fact be the other way round, which is to say that the left eye image as drawn could in fact be the right eye image, and the right eye image as drawn could in fact be the left eye image. This is because some stereoscopic displays tend to shift objects to the right in the right eye image and to the left in the left eye image, so as to simulate the idea that the user is looking through a stereoscopic window onto the scene beyond. However, some HMDs use the arrangement shown in FIG. 5 because this gives the impression to the user that the user is viewing the scene through a pair of binoculars. The choice between these two arrangements is at the discretion of the system designer.

In some situations, an HMD may be used simply to view movies and the like. In this case, there is no change required to the apparent viewpoint of the displayed images as the user turns the user's head, for example from side to side. In other uses, however, such as those associated with virtual reality (VR) or augmented reality (AR) systems, the user's viewpoint needs to track movements with respect to a real or virtual space in which the user is located.

Figure 6:
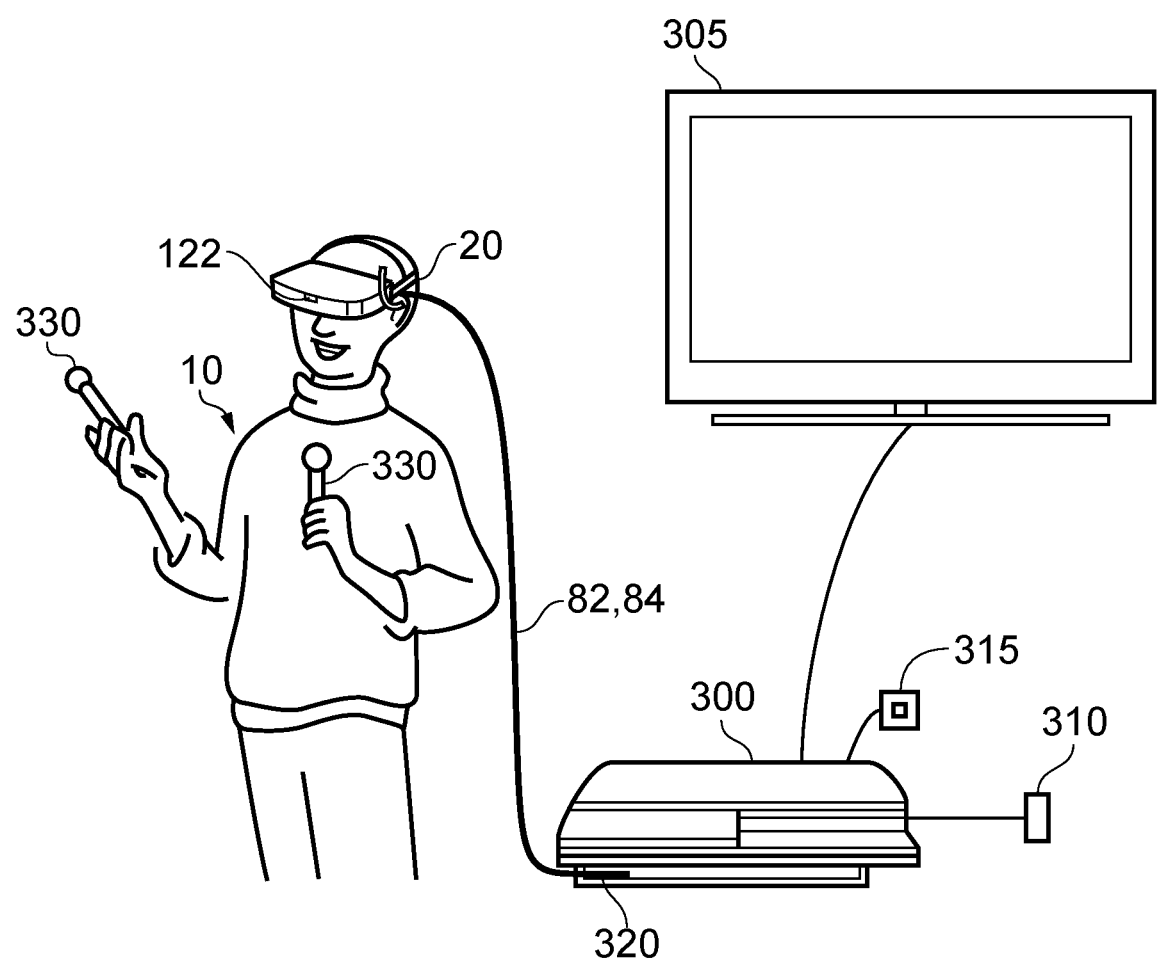
FIGS. 6 and 7 schematically illustrate a user wearing an HMD connected to a Sony® PlayStation 3® games console.

FIG. 6 schematically illustrates an example virtual reality system and in particular shows a user wearing an HMD connected to a Sony® PlayStation 3® games console 300 as an example of a base device. The games console 300 is connected to a mains power supply 310 and (optionally) to a main display screen (not shown). A cable, acting as the cables 82, 84 discussed above (and so acting as both power supply and signal cables), links the HMD 20 to the games console 300 and is, for example, plugged into a USB socket 320 on the console 300. Note that in the present embodiments, a single physical cable is provided which fulfils the functions of the cables 82, 84. In FIG. 6, the user is also shown holding a pair of hand-held controller 330s which may be, for example, Sony® Move® controllers which communicate wirelessly with the games console 300 to control (or to contribute to the control of) game operations relating to a currently executed game program.

The video displays in the HMD 20 are arranged to display images generated by the games console 300, and the earpieces 60 in the HMD 20 are arranged to reproduce audio signals generated by the games console 300. Note that if a USB type cable is used, these signals will be in digital form when they reach the HMD 20, such that the HMD 20 comprises a digital to analogue converter (DAC) to convert at least the audio signals back into an analogue form for reproduction.

Images from the camera 122 mounted on the HMD 20 are passed back to the games console 300 via the cable 82, 84. Similarly, if motion or other sensors are provided at the HMD 20, signals from those sensors may be at least partially processed at the HMD 20 and/or may be at least partially processed at the games console 300. The use and processing of such signals will be described further below.

The USB connection from the games console 300 also provides power to the HMD 20, according to the USB standard.

FIG. 6 also shows a separate display 305 such as a television or other openly viewable display (by which it is meant that viewers other than the HMD wearer may see images displayed by the display 305) and a camera 315, which may be (for example) directed towards the user (such as the HMD wearer) during operation of the apparatus. An example of a suitable camera is the PlayStation Eye camera, although more generally a generic "webcam", connected to the console 300 by a wired (such as a USB) or wireless (such as WiFi or Bluetooth) connection.

The display 305 may be arranged (under the control of the games console) to provide the function of a so-called "social screen". It is noted that playing a computer game using an HMD can be very engaging for the wearer of the HMD but less so for other people in the vicinity (particularly if they are not themselves also wearing HMDs). To provide an improved experience for a group of users, where the number of HMDs in operation is fewer than the number of users, images can be displayed on a social screen. The images displayed on the social screen may be substantially similar to those displayed to the user wearing the HMD, so that viewers of the social screen see the virtual environment (or a subset, version or representation of it) as seen by the HMD wearer. In other examples, the social screen could display other material such as information relating to the HMD wearer's current progress through the ongoing computer game. For example, the HMD wearer could see the game environment from a first person viewpoint whereas the social screen could provide a third person view of activities and movement of the HMD wearer's avatar, or an overview of a larger portion of the virtual environment. In these examples, an image generator (for example, a part of the functionality of the games console) is configured to generate some of the virtual environment images for display by a display separate to the head mountable display.

Figure 7:
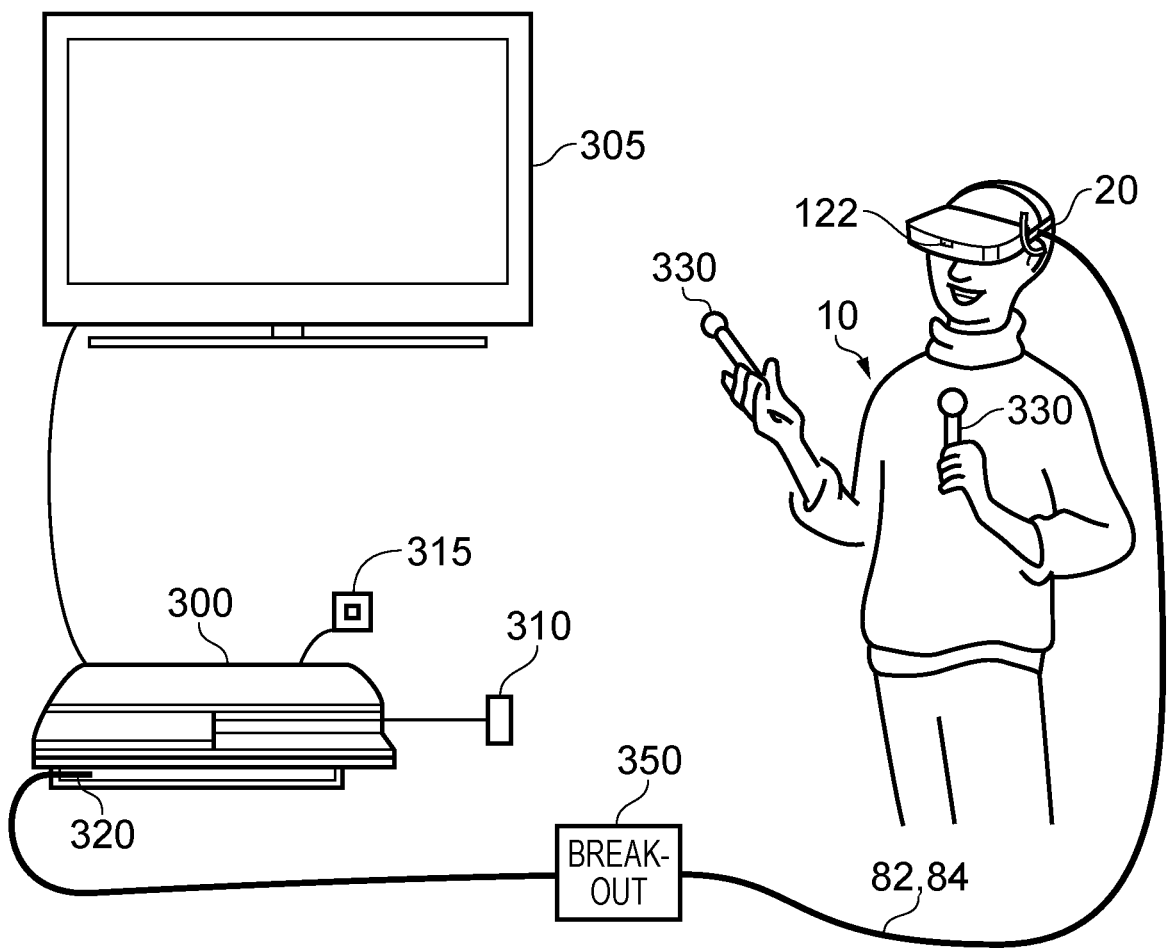

FIG. 7 schematically illustrates a similar arrangement (another example of a virtual reality system) in which the games console is connected (by a wired or wireless link) to a so-called "break out box" acting as a base or intermediate device 350, to which the HMD 20 is connected by a cabled link 82, 84. The breakout box has various functions in this regard. One function is to provide a location, near to the user, for some user controls relating to the operation of the HMD, such as (for example) one or more of a power control, a brightness control, an input source selector, a volume control and the like. Another function is to provide a local power supply for the HMD (if one is needed according to the embodiment being discussed). Another function is to provide a local cable anchoring point. In this last function, it is not envisaged that the break-out box 350 is fixed to the ground or to a piece of furniture, but rather than having a very long trailing cable from the games console 300, the break-out box provides a locally weighted point so that the cable 82, 84 linking the HMD 20 to the break-out box will tend to move around the position of the break-out box. This can improve user safety and comfort by avoiding the use of very long trailing cables.

It will be appreciated that the localisation of processing in the various techniques described in this application can be varied without changing the overall effect, given that an HMD may form part of a set or cohort of interconnected devices (that is to say, interconnected for the purposes of data or signal transfer, but not necessarily connected by a physical cable). So, processing which is described as taking place "at" one device, such as at the HMD, could be devolved to another device such as the games console (base device) or the break-out box. Processing tasks can be shared amongst devices. Source signals, on which the processing is to take place, could be distributed to another device, or the processing results from the processing of those source signals could be sent to another device, as required. So any references to processing taking place at a particular device should be understood in this context. Similarly, where an interaction between two devices is basically symmetrical, for example where a camera or sensor on one device detects a signal or feature of the other device, it will be understood that unless the context prohibits this, the two devices could be interchanged without any loss of functionality.

As mentioned above, in some uses of the HMD, such as those associated with virtual reality (VR) or augmented reality (AR) systems, the user's viewpoint needs to track movements with respect to a real or virtual space in which the user is located.

This tracking is carried out by detecting motion of the HMD and varying the apparent viewpoint of the displayed images so that the apparent viewpoint tracks the motion.

Figure 8:
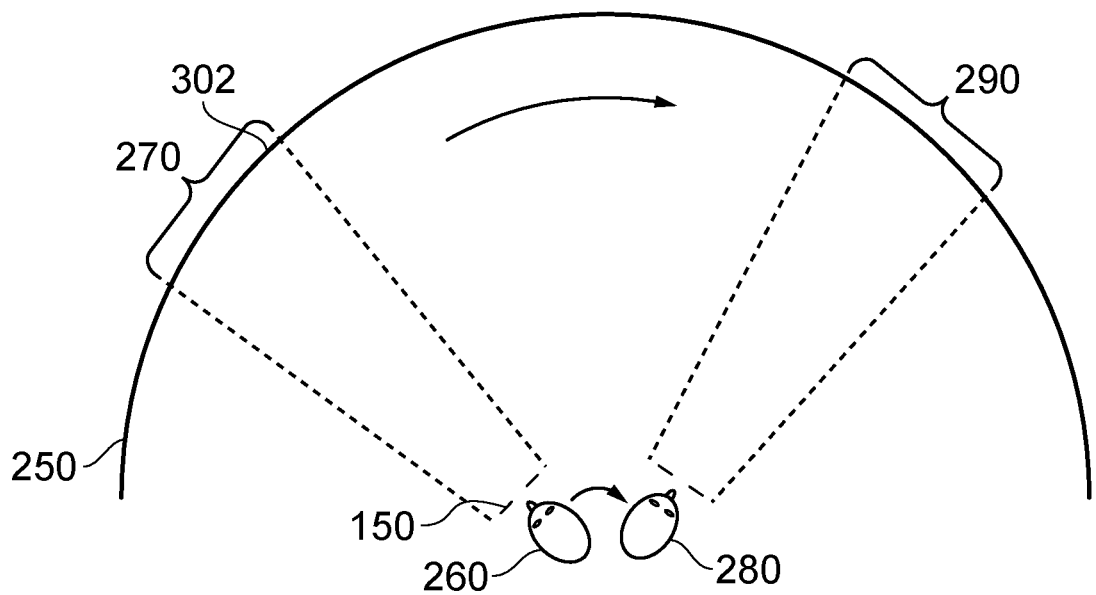
FIG. 8 schematically illustrates a change of view of user of an HMD.

FIG. 8 schematically illustrates the effect of a user head movement in a VR or AR system.

Referring to FIG. 8, a virtual environment is represented by a (virtual) spherical shell 250 around a user. This provides an example of a virtual display screen (VDS). Because of the need to represent this arrangement on a two-dimensional paper drawing, the shell is represented by a part of a circle, at a distance from the user equivalent to the separation of the displayed virtual image from the user. A user is initially at a first position 260 and is directed towards a portion 270 of the virtual environment. It is this portion 270 which is represented in the images displayed on the display elements 150 of the user's HMD. It can be seen from the drawing that the VDS subsists in three dimensional space (in a virtual sense) around the position in space of the HMD wearer, such that the HMD wearer sees a current portion of VDS according to the HMD orientation.

Consider the situation in which the user then moves his head to a new position and/or orientation 280. In order to maintain the correct sense of the virtual reality or augmented reality display, the displayed portion of the virtual environment also moves so that, at the end of the movement, a new portion 290 is displayed by the HMD.

So, in this arrangement, the apparent viewpoint within the virtual environment moves with the head movement. If the head rotates to the right side, for example, as shown in FIG. 8, the apparent viewpoint also moves to the right from the user's point of view. If the situation is considered from the aspect of a displayed object, such as a displayed object 300, this will effectively move in the opposite direction to the head movement. So, if the head movement is to the right, the apparent viewpoint moves to the right but an object such as the displayed object 300 which is stationary in the virtual environment will move towards the left of the displayed image and eventually will disappear off the left-hand side of the displayed image, for the simple reason that the displayed portion of the virtual environment has moved to the right whereas the displayed object 300 has not moved in the virtual environment.

Figure 2:
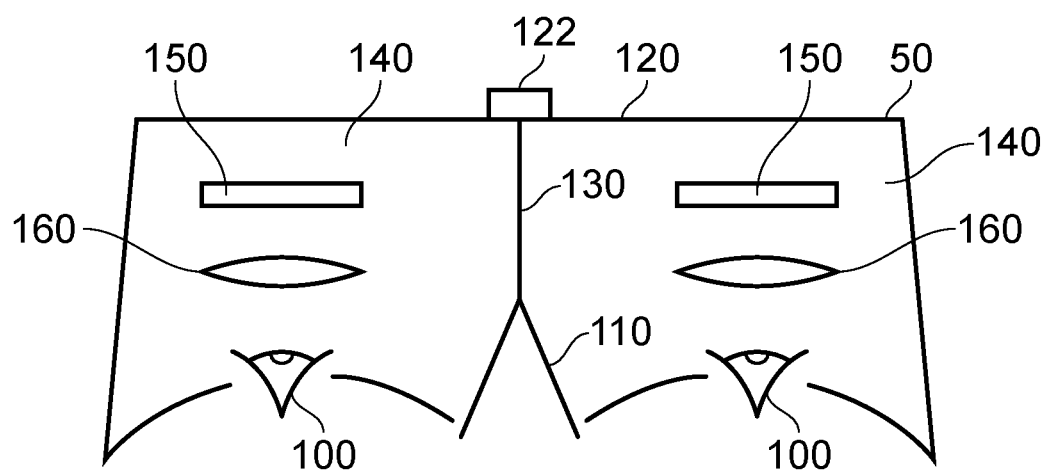
FIG. 2 is a schematic plan view of an HMD.
Figure 9A:
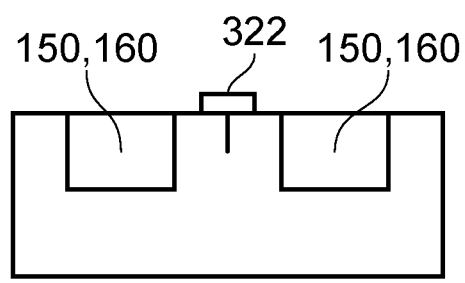
FIGS. 9a and 9b schematically illustrate HMDs with motion sensing.
Figure 9B:
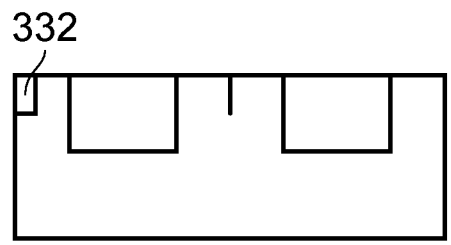

FIGS. 9a and 9b schematically illustrated HMDs with motion sensing. The two drawings are in a similar format to that shown in FIG. 2. That is to say, the drawings are schematic plan views of an HMD, in which the display element 150 and optical elements 160 are represented by a simple box shape. Many features of FIG. 2 are not shown, for clarity of the diagrams. Both drawings show examples of HMDs with a motion detector for detecting motion of the observer's head.

In FIG. 9a, a forward-facing camera 322 is provided on the front of the HMD. This may be the same camera as the camera 122 discussed above, or may be an additional camera. This does not necessarily provide images for display to the user (although it could do so in an augmented reality arrangement). Instead, its primary purpose in the present embodiments is to allow motion sensing. A technique for using images captured by the camera 322 for motion sensing will be described below in connection with FIG. 10. In these arrangements, the motion detector comprises a camera mounted so as to move with the frame; and an image comparator operable to compare successive images captured by the camera so as to detect inter-image motion.

FIG. 9b makes use of a hardware motion detector 332. This can be mounted anywhere within or on the HMD. Examples of suitable hardware motion detectors are piezoelectric accelerometers or optical fibre gyroscopes. It will of course be appreciated that both hardware motion detection and camera-based motion detection can be used in the same device, in which case one sensing arrangement could be used as a backup when the other one is unavailable, or one sensing arrangement (such as the camera) could provide data for changing the apparent viewpoint of the displayed images, whereas the other (such as an accelerometer) could provide data for image stabilisation.

Figure 10:
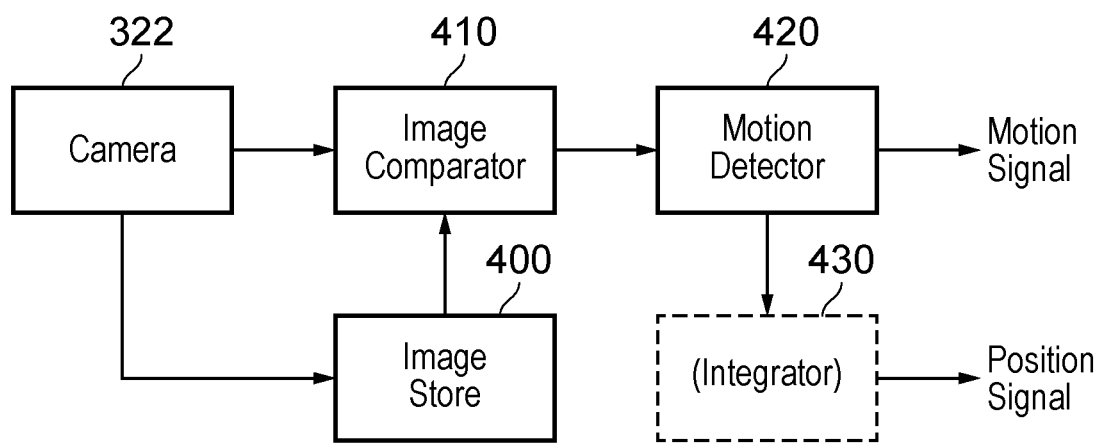
FIG. 10 schematically illustrates a position sensor based on optical flow detection.

FIG. 10 schematically illustrates one example of motion detection using the camera 322 of FIG. 9a.

The camera 322 is a video camera, capturing images at an image capture rate of, for example, 25 images per second. As each image is captured, it is passed to an image store 400 for storage and is also compared, by an image comparator 410, with a preceding image retrieved from the image store. The comparison uses known block matching techniques (so-called "optical flow" detection) to establish whether substantially the whole image has moved since the time at which the preceding image was captured. Localised motion might indicate moving objects within the field of view of the camera 322, but global motion of substantially the whole image would tend to indicate motion of the camera rather than of individual features in the captured scene, and in the present case because the camera is mounted on the HMD, motion of the camera corresponds to motion of the HMD and in turn to motion of the user's head.

The displacement between one image and the next, as detected by the image comparator 410, is converted to a signal indicative of motion by a motion detector 420. If required, the motion signal is converted by to a position signal by an integrator 430.

As mentioned above, as an alternative to, or in addition to, the detection of motion by detecting inter-image motion between images captured by a video camera associated with the HMD, the HMD can detect head motion using a mechanical or solid state detector 332 such as an accelerometer. This can in fact give a faster response in respect of the indication of motion, given that the response time of the video-based system is at best the reciprocal of the image capture rate. In some instances, therefore, the detector 332 can be better suited for use with higher frequency motion detection. However, in other instances, for example if a high image rate camera is used (such as a 200 Hz capture rate camera), a camera-based system may be more appropriate. In terms of FIG. 10, the detector 332 could take the place of the camera 322, the image store 400 and the comparator 410, so as to provide an input directly to the motion detector 420. Or the detector 332 could take the place of the motion detector 420 as well, directly providing an output signal indicative of physical motion.

Other position or motion detecting techniques are of course possible. For example, a mechanical arrangement by which the HMD is linked by a moveable pantograph arm to a fixed point (for example, on a data processing device or on a piece of furniture) may be used, with position and orientation sensors detecting changes in the deflection of the pantograph arm. In other embodiments, a system of one or more transmitters and receivers, mounted on the HMD and on a fixed point, can be used to allow detection of the position and orientation of the HMD by triangulation techniques. For example, the HMD could carry one or more directional transmitters, and an array of receivers associated with known or fixed points could detect the relative signals from the one or more transmitters. Or the transmitters could be fixed and the receivers could be on the HMD. Examples of transmitters and receivers include infra-red transducers, ultrasonic transducers and radio frequency transducers. The radio frequency transducers could have a dual purpose, in that they could also form part of a radio frequency data link to and/or from the HMD, such as a Bluetooth® link.

Figure 11:
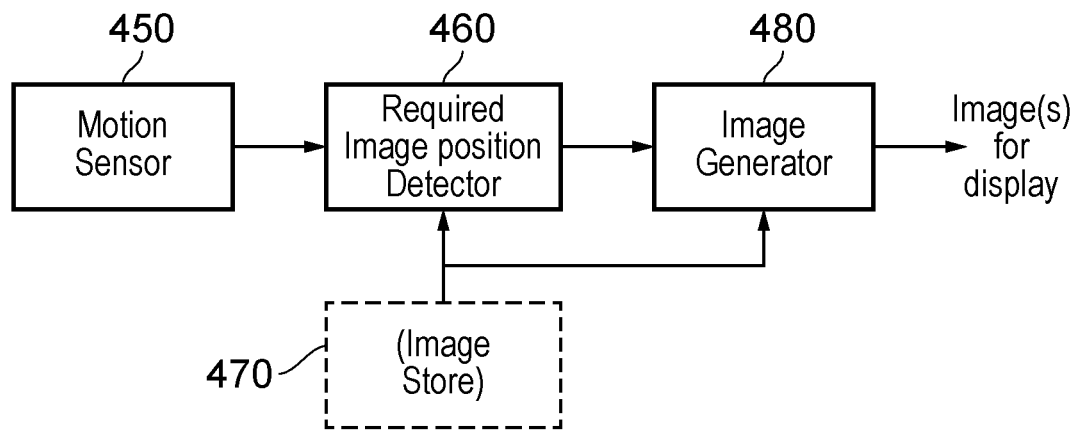
FIG. 11 schematically illustrates image processing carried out in response to a detected position or change in position of an HMD.

FIG. 11 schematically illustrates image processing carried out in response to a detected position or change in position of the HMD.

As mentioned above in connection with FIG. 10, in some applications such as virtual reality and augmented reality arrangements, the apparent viewpoint of the video being displayed to the user of the HMD is changed in response to a change in actual position or orientation of the user's head.

With reference to FIG. 11, this is achieved by a motion sensor 450 (such as the arrangement of FIG. 10 and/or the motion detector 332 of FIG. 9b) supplying data indicative of motion and/or current position to a required image position detector 460, which translates the actual position of the HMD into data defining the required image for display. An image generator 480 accesses image data stored in an image store 470 if required, and generates the required images from the appropriate viewpoint for display by the HMD. The external video signal source can provide the functionality of the image generator 480 and act as a controller to compensate for the lower frequency component of motion of the observer's head by changing the viewpoint of the displayed image so as to move the displayed image in the opposite direction to that of the detected motion so as to change the apparent viewpoint of the observer in the direction of the detected motion.

Figure 12:
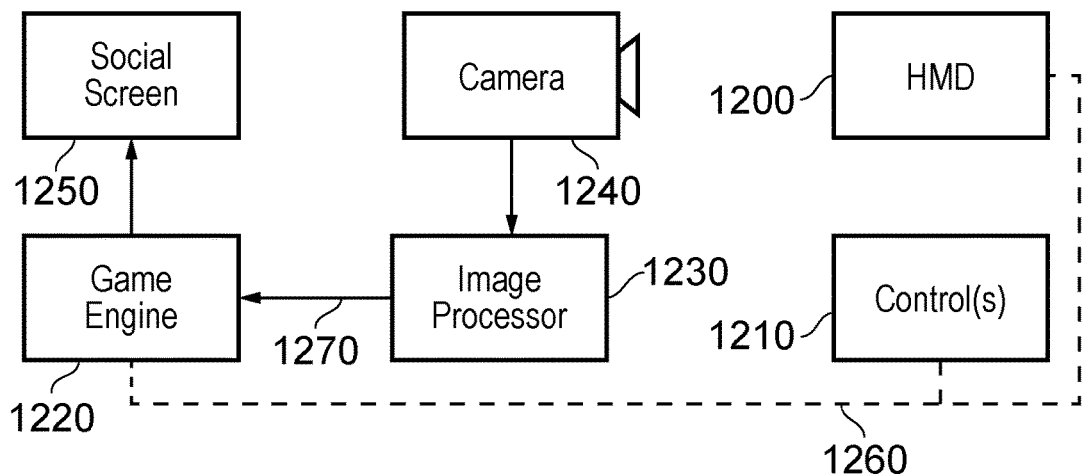
FIG. 12 schematically illustrates a virtual reality system.

FIG. 12 schematically illustrates a virtual reality system or apparatus comprising: an HMD 1200, one or more user controls 1210, a game engine 1220, an image processor 1230, a camera 1240 and optionally a social screen 1250 of the type discussed above.

In use, the user wears the HMD 1200 and can operate the one or more controls or controllers 1210. Examples of suitable user controls include the controller 330 shown in FIGS. 6 and 7. The game engine 1220 provides images and other content such as audio content to the HMD via a wired or wireless connection 1260 and receives input from the controllers 1210 via the connection 1260 or via the camera 1240.

The camera 1240 is directed towards the HMD and/or controllers in use. The camera 1240 can therefore capture a current position and/or orientation of the HMD 1200 and a current position and/or orientation of the controllers 1210, each of which is detected from the captured images by the image processor 1230. These captured positions and/or orientations can be used to control data processing operations of the game engine 1220, such as game control operations.

Therefore, in examples, there are various types of control input to the game engine 1220, such as control inputs 1270 derived by the image processor 1230 from captured images captured by the camera 1240 and/or control inputs received from the controls 1210 via the wired or wireless connection 1260. The image processor 1230 provides an example of an image processor to detect, from one or more images captured by the camera 1240, one or more of: (i) a current orientation of the HMD 1200; and (ii) a current location of the HMD 1200. The game engine 1220 provides an example of a data processor to direct a data processing function according to the detection by the image processor. In some examples, the data processing function is a gameplay function.

As discussed below, a further function which can be carried out by the apparatus of FIG. 12 is to detect a current orientation of the HMD relative to a base orientation. In some examples, the base orientation of the HMD is an orientation facing the camera 1240, but other base orientations could be used. The game engine can provide content to the HMD to initiate a movement towards the base orientation. Examples of this arrangement will be discussed in detail below.

Therefore, in example arrangements, FIG. 12 provides a virtual reality apparatus comprising an HMD 1200; a detector (1230, 1220) to detect a deviation of a current orientation of the HMD from a base orientation of the HMD; and a generator 1220 to generate content (to be discussed below) for presentation to the wearer of the HMD to prompt the wearer of the HMD to turn his head so as to change the orientation of the HMD towards the base orientation.

Figure 14:
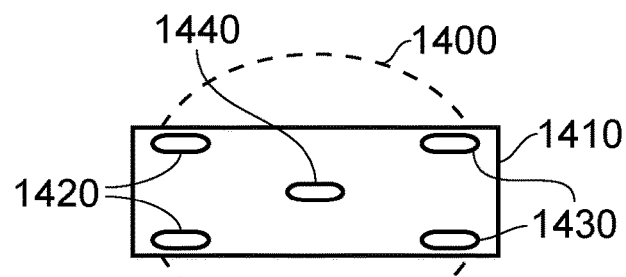
FIG. 14 is a schematic front view of an HMD.
Figure 15:
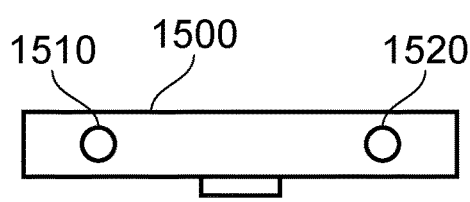
FIG. 15 is a schematic diagram of a camera.

Example techniques for detecting a current orientation and/or location of the HMD will now be discussed with reference to FIGS. 13 to 15. In particular, FIG. 13 is a schematic side view of an HMD, FIG. 14 is a schematic front view of an HMD and FIG. 15 is a schematic diagram of a camera such as the camera 1240.

Figure 13:
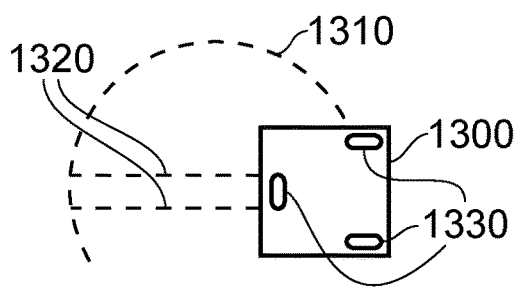
FIG. 13 is a schematic side view of an HMD.

Referring to FIG. 13, the HMD 1300 is shown on a user's head 1310 with the one or more straps holding the HMD on the user's head being shown in schematic broken lines 1320. In the diagram, the user is represented as facing towards the right hand side of the page.

One or more optically detectable features are provided on the HMD. In the example of FIG. 13, the optically detectable features are a plurality of light emitters which, in this example, are provided as light emitting diodes (LEDs) 1330. Similarly, in the front view in FIG. 14 (in which the user's head is shown as a broken line 1400 relative to the front view 1410 of the HMD, so that in the example the user is shown looking out of the page) further LEDs are provided. In fact, in an example arrangement in which the HMD curves around the user's head, LEDs 1420 or 1430 can be the same as some of those visible in FIG. 13 from a side view. A further LED 1440 is provided towards the middle of the HMD.

These LEDs can be arranged to be optically detectable by the camera 1240. In some examples, this can be by detection of bright points of light in the scene represented by images captured by the camera 1240. In other examples, the colour(s) of one or more of the LEDs can be selectable under control of the game engine 1220, for example to provide an asymmetric (left to right) pattern of illumination and/or to allow multiple HMD users present in the same captive image to be distinguished. In further examples, a time-based modulation of the LEDs can be used, again to provide a system with the ability to distinguish between multiple users, to provide an asymmetric pattern of illumination and/or to assist in detection of the presence of the LEDs. Any one or more of these techniques can be combined.

The presence of the LEDs on the front and sides of the HMD give rise to a preferred or base orientation which faces the camera. However, other base orientations could be used. For example, if markings and/or LEDs were provided on the HMD strap a base orientation could be the user's head pointing away from the camera. If markings and/or LEDs were provided on a top strap or surface of the HMD, a preferred orientation could have the camera above the HMD. Note that markings and/or LEDs are not required; the system could instead (or as well) recognise other features such as the shape and/or configuration of the HMD and/or aspects of the user's head.

The camera 1240 is shown schematically in FIG. 15 as a camera arrangement 1500 having a stereoscopic pair 1510, 1520 of laterally spaced cameras so as to provide the functionality of a depth camera. The stereoscopic camera of FIG. 15 is just one example of a depth camera. Other types of cameras such as those using so-called structured infrared light (for example, a projected grid of infrared light from which depth information can be acquired using an infrared sensor) are also capable of acting as the depth camera to detect the depth parameter of image material in a captured image. Other depth camera techniques can include arrangements using ultrasonic depth detection.

It will be appreciated that the depth detection aspect relates to detection of the location of the HMD, whereas the detection of a current orientation can be carried out by a camera which does not have the depth functionality. Therefore, some examples provide a depth camera but this is not an essential feature of examples relating to the detection of a deviation of a current orientation of the HMD from a base orientation of the HMD.

The detection of the orientation and its deviation from a base orientation will be discussed below with reference to FIGS. 17A to 19B.

Figure 16:
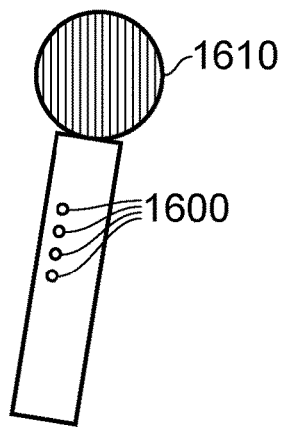
FIG. 16 is a schematic diagram of a hand-held controller.

FIG. 16 is a schematic diagram of a handheld controller comprising one or more buttons 1600 such that when the user presses one or more of the buttons 1600, a signal can be sent to the game engine 1220 by the link 1260, and an illuminated portion 1610, the position of which can be detected from images captured by the camera 1240. Again, the colour, brightness and temporal modulation (or any one or more of these) can be controlled by the game engine 1220, for example to assist in detection or in distinguishing multiple game controllers from one another.

FIGS. 17A, 18A and 19A schematically represent orientations relative to a camera, of a user wearing an HMD and FIGS. 17B, 18B and 19B schematically represent captured images of the arrangements of FIGS. 17A, 18A and 19A respectively.

In FIG. 17A, a plan view (that is to say, a schematic view looking downwards) is shown of a user 1700 wearing an HMD 1710 and facing a camera 1720, for example, the camera 1240 discussed above. FIG. 17B shows a schematic representation of a resulting image or part of an image of the user's head wearing the HMD, in which a pattern of the light emitters 1730 characteristic of the HMD facing the camera can be detected by the image processor 1230.

In FIG. 18A, the user has turned his head slightly to one side, so that the view captured by the camera 1720 (as shown schematically in FIG. 18B) demonstrates a characteristic pattern of the LEDs 1730 indicative of the user having turned his head to the side and indicating, by the asymmetric nature of the pattern as drawn, which direction the user has turned his head.

In FIG. 19A, the user has turned his head by 90 degrees to the side relative to the camera 1720. The captured image shown schematically in FIG. 19B shows fewer of the LEDs indicative of the user having turned his head well away from the camera 1720.

Especially in a full immersion type of virtual reality system, it is quite possible that the user will move so as to face away from the camera 1240 without necessarily realising that the user has done so. Example embodiments provide techniques to prompt the user to return towards the base orientation, which is an orientation facing the camera (FIG. 17A), in a convenient and non-disruptive way without necessarily disturbing the user's use of the HMD, for example in a gameplay situation.

Figure 20:
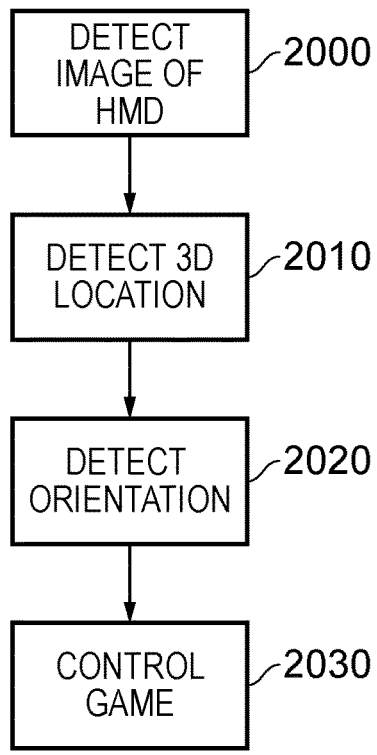
FIG. 20 is a schematic flowchart representing a control technique.

Referring to FIG. 20, a schematic flowchart representing a control technique for use by the game engine 1220 comprises the steps of: detecting an image of the HMD at a step 2000 (by the camera 1240); detecting a 3D location of the HMD at a step 2020 and detecting the orientation of the HMD at a step 2220 (by the image processor 1230); and controlling a data processing function such as controlling gameplay by the game engine 1220 in response to the detected 3D location and detected orientation at a step 2030.

As discussed above, the detection of the 3D location is optional, and it is also noted that the steps 2010, 2020 can be carried out in either order or indeed both together by the image processor 1230.

Figure 21:
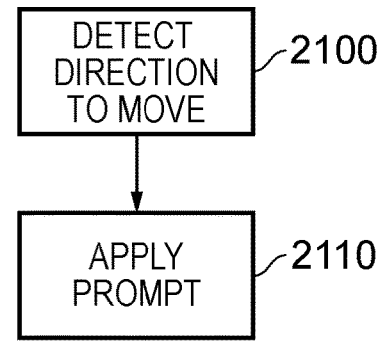
FIG. 21 is a schematic flowchart illustrating a method.

FIG. 21 is a schematic flowchart illustrating a method in which the image processor and/or game engine 1230, 1220 detect a direction in which the HMD should move in order to change its orientation towards a base orientation (at a step 2100) and, at a step 2110 the game engine acts as a generator to generate content for presentation to the wearer of the HMD to prompt the wearer of the HMD to turn his head so as to change the orientation of the HMD towards the base orientation.

In the examples shown in FIGS. 18B and 19B, the base orientation change to return towards a base orientation such as an orientation facing the camera is shown schematically by arrows 1800, 1900.

Figure 22:
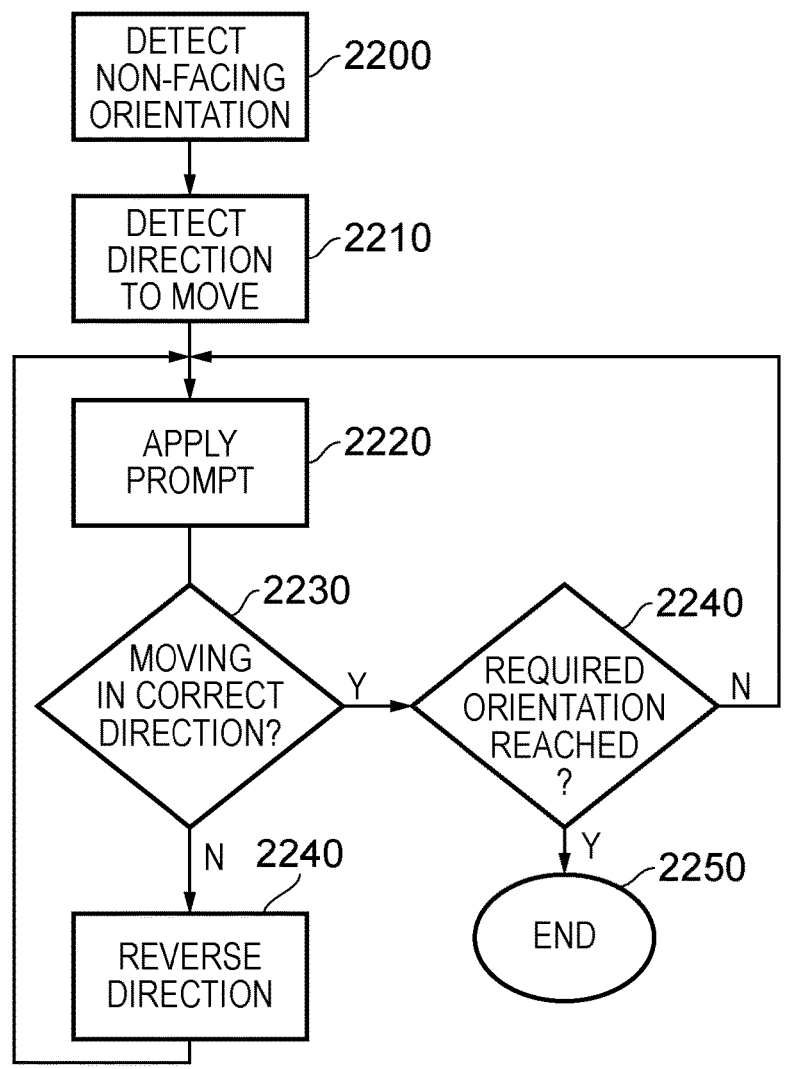
FIG. 22 is a schematic flowchart illustrating a method.

FIG. 22 is a schematic flowchart providing more detail of example arrangements to achieve this.

At a step 2200, the image processor and/or game engine detect that the HMD is not facing the camera, or in other words detect a deviation of a current orientation of the HMD from a base orientation of the HMD. Note that at the step 2200, the detector can be configured to disregard deviations of less than a threshold deviation (such as +/−10 degrees) from the base orientation.

At a step 2210, the image processor and/or game engine detect a required direction to move in order to change the orientation of the HMD towards the base orientation. As discussed above, this can be achieved by, for example, a mapping of the current detected orientation to a base orientation change. In order words, the detection with reference to FIG. 18B is that the user has turned his head in the direction represented by FIG. 18A, and so the required change is a change in the opposite direction shown by the arrow 1800. The fact that the user has changed the orientation of the HMD away from the base orientation is detectable by the absence of the pattern of illumination or other detectable markers shown in FIG. 17B. The sense or direction of the change can be detected from the remaining visible illuminated markers and their relative configuration, including any asymmetry of the illuminated markers (so that, for example, if the illuminated markers at each lateral end of the HMD have different colours, the colour which is remaining in the captured image indicates which direction the user has turned the HMD). In other examples, any of the motion sensing techniques of FIGS. 9A, 9B, 10 and 11 can be used such that motion of the HMD is tracked and detected (for example being transmitted to the game engine via the connection 1260 from the HMD 1200) since the HMD was last facing the camera, so that the required direction to move back to a facing orientation is derived from the opposite of the detected net motion since that last occasion.

At a step 2220, the game engine generates a prompt, by generating content for presentation to the wearer of the HMD to prompt the wearer of the HMD to turn his head so as to change the orientation of the HMD towards the base orientation. This prompt is presented to the wearer of the HMD or applied at the step 2220.

Then, after presentation of the content generated by the generator to the wearer of the HMD, the detector (the image processor and/or game engine) is configured to detect a further or subsequent change in the orientation of the HMD at a step 2230 and to detect whether the detected change in orientation is in a direction towards or away from the base orientation. If the detected change in orientation is in the "correct" sense, which is to say it is towards the base orientation, then at a step 2240 the image processor and/or game engine detect whether the base orientation has been reached. If yes, the process ends at a step 2250, and if no, the prompt (or another prompt) is applied at the step 2220.

If, however, at the step 2230, a detection is made that the user has changed the orientation of the HMD but in the "wrong" sense or direction, which is to say away from the base orientation, then the detector (the image processor and/or the game engine) can detect that an error may have been made in the direction detection at the step 2210 and the detected direction is reversed at a step 2240 so that next time the step 2220 applies a prompt to the user, the prompt will be in the opposite sense or direction. Therefore, when the detected change in orientation is in a direction away from the base orientation the generator is configured to change the generator content.

Techniques for providing content to the user which may prompt the user to change the orientation of the HMD will now be discussed with reference to FIGS. 23 to 26.

Figure 23:
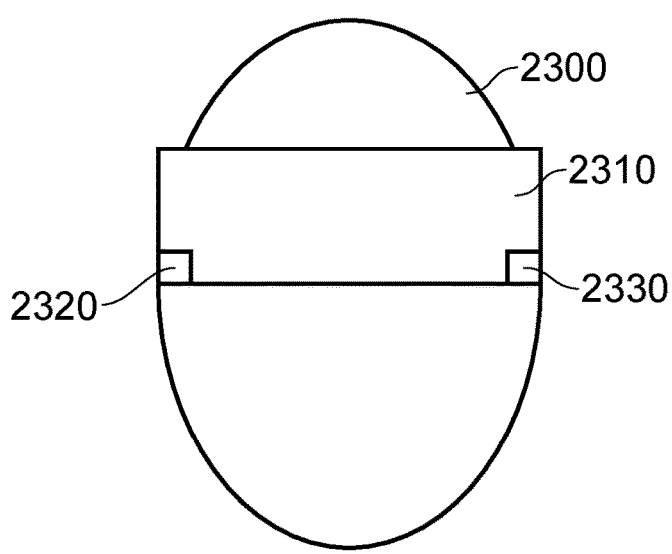
FIG. 23 schematically illustrates a user wearing an HMD.

FIG. 23 schematically represents a user 2300 (facing out of the page) wearing an HMD 2310. The HMD comprises asymmetrically disposed content providing elements 2320, 2330. In some examples, these are vibration elements. In other examples, these are illumination devices visible to a wearer of the HMD. In further embodiments, both of these could be provided.

In the example of FIG. 23, the generation and provision of content and its presentation to the user could comprise:
  a) In a case in which the elements 2320, 2330 comprise vibration devices, the generator is configured to generate, as the generated content, a signal to control one or more of the vibration devices to vibrate. In these examples, a vibration such as a gentle buzz felt by the user to one or other side of the user's head can indicate to the user to turn his head in that direction (or indeed, a different arrangement could mean that the user is prompted to turn his head away from the vibration; the arrangement in use can be indicated to the user or the user can simply learn it by trial and error).
  b) In the case that the elements 2320, 2330 comprise one or more illumination devices visible to a wearer of the HMD, the generator can be configured to generate, as the generated content, a signal to control one or more of the illumination devices to illuminate. Once again, the user could be prompted to turn his head towards the light from the illuminated illumination device or indeed to turn away from it, with the arrangement in use being presented to the user beforehand or learnt by the user by trial and error.
  c) Both of these could be used in the same HMD.

Figure 24:
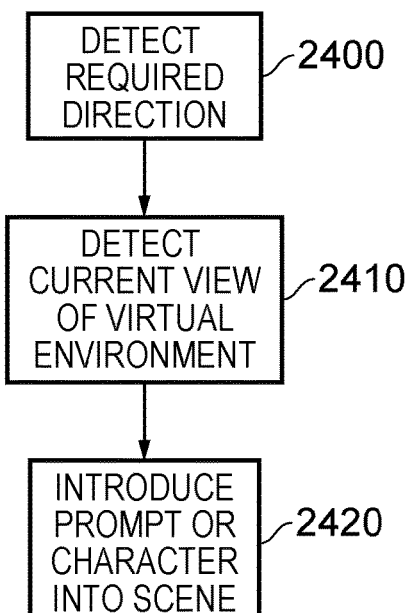
FIG. 24 is a schematic flowchart illustrating a method.

FIG. 24 is a schematic flowchart illustrating a method in which a virtual environment is modified to provide the prompt to the wearer of the HMD to turn his head.

At a step 2400, a required direction of movement is detected (corresponding to the step 2210 of FIG. 22).

Then, at a step 2410, the game engine detects a current view by the user wearing the HMD of a virtual environment. This could be a virtual environment representing a game or it could be another type of virtual environment. But as discussed with reference to FIG. 8 above, the user will have a current view (shown in FIG. 8 as a view 270 or 290 of the virtual environment 250). Within that virtual environment, the game engine can then introduce a prompt or character or other item into the scene at a step 2420.

The step 2420 could involve introducing an item of interest to the user (for example, in a game environment, a prize or friendly avatar) displaced to one side of the user's current viewpoint (but still currently visible by the user) in a direction which will prompt the user to turn towards the introduced item or character. In other examples, an item or character which the user wishes to avoid in the virtual environment could be introduced to one side of the user's current viewpoint so as to prompt the user to turn away from that direction (and therefore towards the base orientation of the HMD). For example, a hazard or enemy could be introduced into the virtual environment.

Figure 25:
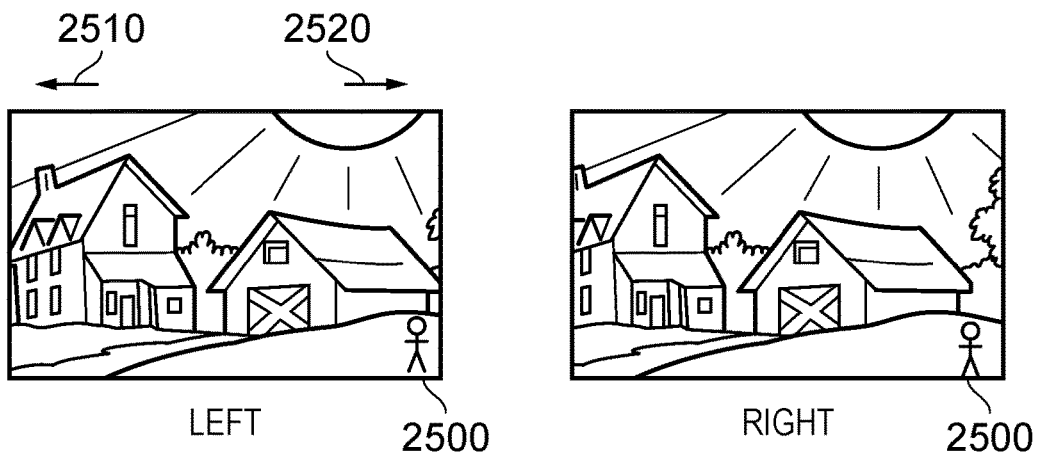
FIGS. 25 and 26 schematically illustrate example display images.
Figure 26:

FIG. 25 schematically illustrates example display images similar to those shown in FIG. 5 discussed above, in which a virtual character 2500 has been introduced to one side of the user's current viewpoint. If the virtual character 2500 is an enemy, the user is likely to turn his head to the left 2510 to move away from the enemy 2500. If the virtual character 2500 is perceived to be a friend then the user if more likely to turn his head to the right 2520 in a direction towards the virtual character 2500. Similar arrangements apply to examples involving virtual hazards or virtual prizes.

In FIG. 26, again example displays to the left and right eyes are shown, in which a simpler indication 2600 is provided to one or both eyes indicating a direction which the user should turn his head in. This can be provided within the virtual environment but as a direct indication such as an arrow as drawn so that the user is in no doubt as to which direction he should turn his head. In some examples, a user who follows the indication 2600 could be rewarded by the presence of, for example, a virtual prize or other benefit in the game environment at the orientation required by the camera.

These arrangements therefore provide an example in which the HMD is configured to display a representation of a virtual environment; and the generator (for example, the image processor and/or game engine) is configured to generate (or "spawn"), as the generated content, one or more features or points of interest at a position in the virtual environment dependent upon a current view by the HMD of the virtual environment and a direction, relative to the current orientation of the HMD, of the base orientation of the HMD.

It will be appreciated that example embodiments can be implemented by computer software operating on a general purpose computing system such as a games machine. In these examples, computer software, which when executed by a computer, causes the computer to carry out any of the methods discussed above is considered as an embodiment of the present disclosure. Similarly, embodiments of the disclosure are provided by a non-transitory, machine-readable storage medium which stores such computer software.

It will also be apparent that numerous modifications and variations of the present disclosure are possible in light of the above teachings. It is therefore to be understood that within the scope of the appended claims, the disclosure may be practised otherwise than as specifically described herein.

The invention claimed is:

1. A virtual reality apparatus comprising:
a head mountable display (HMD) for a wearer;
a detector to detect a deviation of a current orientation of the HMD from a base orientation of the HMD, where the base orientation is a predetermined orientation referenced to a real-world reference;
a processor executing computer code to implement a generator to generate content for presentation to the wearer of the HMD to prompt the wearer of the HMD to turn his head so as to change the orientation of the HMD towards the base orientation; and
one or more vibration devices disposed in the HMD, wherein the generator is configured to generate the content to include a signal to control the one or more vibration devices to vibrate in such a way as to prompt the wearer of the HMD to turn his head so as to change the orientation of the HMD towards the base orientation.

2. Apparatus according to claim 1, comprising:
a camera to capture one or more images;
in which the base orientation of the HMD is an orientation facing the camera.

3. Apparatus according to claim 2, comprising:
an image processor to detect, from one or more images captured by the camera, one or more of:
(i) a current orientation of the HMD; and
(ii) a current location of the HMD; and
a data processor to direct a data processing function according to the detection by the image processor.

4. Apparatus according to claim 3, in which the data processing function is a gameplay function.

5. Apparatus according to claim 3, in which the camera is a depth camera.

6. Apparatus according to claim 2, in which the HMD comprises one or more optically detectable features.

7. Apparatus according to claim 6, in which the one or more optically detectable features comprise a plurality of light emitters.

8. Apparatus according to claim 1, in which:
the HMD comprises one or more illumination devices visible to the wearer of the HMD; and
the generator is configured to generate, as the generated content, a signal to control one or more of the illumination devices to illuminate.

9. Apparatus according to claim 1, in which:
the HMD is configured to display a representation of a virtual environment; and
the generator is configured to generate, as the generated content, one or more features at a position in the virtual environment dependent upon a current view by the HMD of the virtual environment and a direction, relative to the current orientation of the HMD, or the base orientation of the HMD.

10. Apparatus according to claim 1, in which:
the detector is configured to detect, after presentation of the content generated by the generator, a change in orientation of the HMD; and
when the detected change in orientation is in a direction away from the base orientation, the generator is configured to change the generated content.

11. Apparatus according to claim 1, in which the detector is configured to disregard deviations of less than a threshold deviation.

12. A method comprising:
detecting a deviation of a current orientation of a head mountable display (HMD) from a base orientation of the HMD, where the base orientation is a predetermined orientation referenced to a real-world reference;
generating content for presentation to a wearer of the HMD to prompt the wearer of the HMD to turn his head so as to change the orientation of the HMD towards the base orientation; and
providing one or more vibration devices within the HMD, wherein the generating includes generating the content to include a signal to control the one or more vibration devices to vibrate in such a way as to prompt the wearer of the HMD to turn his head so as to change the orientation of the HMD towards the base orientation.

13. A non-transitory, machine-readable storage medium which stores computer software, which when executed by a computer, causes the computer to carry out actions, comprising:
- detecting a deviation of a current orientation of a head mountable display (HMD) from a base orientation of the HMD, where the base orientation is a predetermined orientation referenced to a real-world reference;
- generating content for presentation to a wearer of the HMD to prompt the wearer of the HMD to turn his head so as to change the orientation of the HMD towards the base orientation; and providing one or more vibration devices within the HMD, wherein the generating includes generating the content to include a signal to control the one or more vibration devices to vibrate in such a way as to prompt the wearer of the HMD to turn his head so as to change the orientation of the HMD towards the base orientation.

* * * * *